United States Patent
Khalsa et al.

(10) Patent No.: US 9,646,069 B2
(45) Date of Patent: *May 9, 2017

(54) ROLE-DRIVEN NOTIFICATION SYSTEM INCLUDING SUPPORT FOR COLLAPSING COMBINATIONS

(71) Applicant: Oracle International Corporation, Redwood Shores, CA (US)

(72) Inventors: Suchet Singh Khalsa, Bangalore (IN); Archana Shukla, Bangalore (IN); Prashant Kumar Shetty, Bangalore (IN); Jeffrey Doering, Bend, OR (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,835

(22) Filed: Oct. 7, 2015

(65) Prior Publication Data
US 2016/0028581 A1    Jan. 28, 2016

Related U.S. Application Data

(63) Continuation of application No. 13/835,307, filed on Mar. 15, 2013, now Pat. No. 9,219,749.
(Continued)

(51) Int. Cl.
*G06F 15/173* (2006.01)
*G06F 17/30* (2006.01)
(Continued)

(52) U.S. Cl.
CPC .. *G06F 17/30575* (2013.01); *G06F 17/30082* (2013.01); *G06F 17/30283* (2013.01);
(Continued)

(58) Field of Classification Search
CPC ............ H04L 41/0627; H04L 41/0843; H04L 12/1895; H04L 12/587
(Continued)

(56) References Cited

U.S. PATENT DOCUMENTS

| 4,939,723 A | 7/1990 | Harley, Jr. et al. |
| 6,052,684 A | 4/2000 | Du |

(Continued)

FOREIGN PATENT DOCUMENTS

| CN | 104604201 A | 5/2015 |
| CN | 104737517 A | 6/2015 |

(Continued)

OTHER PUBLICATIONS

Afgan et al., CloudMan as a Tool Execution Framework for the Cloud, MIPRO, 2012 Proceedings of the 35th, International Convention, IEEE, XP032201952, ISBN: 978-1-4673-2577-6, May 21, 2012, pp. 437-441.
(Continued)

*Primary Examiner* — El Hadji Sall
(74) *Attorney, Agent, or Firm* — Kilpatrick Townsend & Stockton LLP

(57) ABSTRACT

Embodiments of the invention relate to a method of implementing role-driven notification. The method includes storing, by a cloud infrastructure system including computing devices, notification templates. Each of the notification templates are associated with a role. The method further includes determining that a user is associated with a first role and a second role, determining that the first role is associated with a first notification template and the second role is associated with a second notification template. Further, the method includes combining the first template and the second
(Continued)

template to generate a third template, based on the third template, generating a notification. The method then, sends the notification to the user.

15 Claims, 18 Drawing Sheets

Related U.S. Application Data

(60) Provisional application No. 61/698,413, filed on Sep. 7, 2012, provisional application No. 61/698,459, filed on Sep. 7, 2012, provisional application No. 61/785,299, filed on Mar. 14, 2013.

(51) Int. Cl.
| | |
|---|---|
| G06Q 10/06 | (2012.01) |
| G06Q 30/06 | (2012.01) |
| H04L 12/24 | (2006.01) |
| H04L 12/26 | (2006.01) |
| H04L 12/911 | (2013.01) |
| H04L 29/06 | (2006.01) |

(52) U.S. Cl.
CPC ... *G06F 17/30339* (2013.01); *G06Q 10/0633* (2013.01); *G06Q 10/06315* (2013.01); *G06Q 30/0633* (2013.01); *G06Q 30/0635* (2013.01); *H04L 41/00* (2013.01); *H04L 41/0686* (2013.01); *H04L 41/50* (2013.01); *H04L 41/5041* (2013.01); *H04L 41/5054* (2013.01); *H04L 41/5064* (2013.01); *H04L 43/0876* (2013.01); *H04L 47/70* (2013.01); *H04L 63/10* (2013.01); *H04L 63/20* (2013.01); *G06F 17/30174* (2013.01)

(58) Field of Classification Search
USPC .................................. 709/223, 206, 203, 200
See application file for complete search history.

(56) References Cited

U.S. PATENT DOCUMENTS

| | | | |
|---|---|---|---|
| 6,222,832 | B1 | 4/2001 | Proctor |
| 6,334,193 | B1 | 12/2001 | Buzsaki |
| 6,611,506 | B1 | 8/2003 | Huang et al. |
| 6,650,433 | B1 | 11/2003 | Keane et al. |
| 6,976,798 | B2 | 12/2005 | Keane et al. |
| 7,790,393 | B2 | 9/2010 | Lyamichev et al. |
| 8,165,152 | B2 | 4/2012 | Sammour et al. |
| 8,266,616 | B1 | 9/2012 | Jacquot et al. |
| 8,468,244 | B2 | 6/2013 | Redlich et al. |
| 8,856,077 | B1 | 10/2014 | Roth et al. |
| 8,856,082 | B2 | 10/2014 | Hale et al. |
| 9,203,866 | B2 | 12/2015 | Chatterjee et al. |
| 9,219,749 | B2 | 12/2015 | Khalsa et al. |
| 9,336,030 | B1 | 5/2016 | Marr et al. |
| 9,336,483 | B1 | 5/2016 | Abeysooriya et al. |
| 2002/0004390 | A1 | 1/2002 | Cutaia et al. |
| 2002/0091863 | A1 | 7/2002 | Schug |
| 2004/0243941 | A1 | 12/2004 | Fish |
| 2005/0289072 | A1 | 12/2005 | Sabharwal |
| 2007/0005536 | A1 | 1/2007 | Caswell et al. |
| 2007/0028098 | A1 | 2/2007 | Baartman et al. |
| 2008/0155039 | A1* | 6/2008 | Fernandes ............ G06Q 10/107 709/206 |
| 2008/0250074 | A1 | 10/2008 | Parkinson |
| 2009/0024522 | A1 | 1/2009 | Reunert et al. |
| 2009/0089407 | A1 | 4/2009 | Chalupa et al. |
| 2009/0106578 | A1 | 4/2009 | Dilman et al. |
| 2009/0217267 | A1 | 8/2009 | Gebhart et al. |
| 2009/0259683 | A1 | 10/2009 | Murty |
| 2009/0293046 | A1* | 11/2009 | Cheriton .................. G06F 8/40 717/136 |
| 2009/0300604 | A1 | 12/2009 | Barringer |
| 2010/0114618 | A1 | 5/2010 | Wilcock et al. |
| 2010/0191774 | A1 | 7/2010 | Mason, Jr. et al. |
| 2010/0333116 | A1 | 12/2010 | Prahlad et al. |
| 2011/0004679 | A1 | 1/2011 | Lo et al. |
| 2011/0035444 | A1* | 2/2011 | Hill ........................ G06Q 10/10 709/204 |
| 2011/0131309 | A1 | 6/2011 | Akiyama et al. |
| 2011/0138051 | A1 | 6/2011 | Dawson et al. |
| 2011/0138055 | A1 | 6/2011 | Daly et al. |
| 2011/0145199 | A1 | 6/2011 | Prasad Palagummi |
| 2011/0225461 | A1 | 9/2011 | Wookey |
| 2011/0288968 | A1 | 11/2011 | King et al. |
| 2011/0295998 | A1 | 12/2011 | Ferris et al. |
| 2011/0296000 | A1 | 12/2011 | Ferris et al. |
| 2011/0296018 | A1 | 12/2011 | Deng et al. |
| 2011/0307523 | A1 | 12/2011 | Balani et al. |
| 2011/0313902 | A1 | 12/2011 | Liu et al. |
| 2011/0314466 | A1 | 12/2011 | Berg et al. |
| 2011/0320605 | A1 | 12/2011 | Kramer et al. |
| 2012/0005341 | A1 | 1/2012 | Seago et al. |
| 2012/0032945 | A1 | 2/2012 | Dare et al. |
| 2012/0036220 | A1 | 2/2012 | Dare et al. |
| 2012/0036245 | A1 | 2/2012 | Dare et al. |
| 2012/0036440 | A1 | 2/2012 | Dare et al. |
| 2012/0036442 | A1 | 2/2012 | Dare et al. |
| 2012/0036552 | A1 | 2/2012 | Dare et al. |
| 2012/0041844 | A1 | 2/2012 | Shen et al. |
| 2012/0047357 | A1 | 2/2012 | Bealkowski |
| 2012/0072555 | A1 | 3/2012 | DeLuca et al. |
| 2012/0079134 | A1 | 3/2012 | Outhred et al. |
| 2012/0102160 | A1 | 4/2012 | Breh et al. |
| 2012/0131194 | A1 | 5/2012 | Morgan |
| 2012/0198073 | A1 | 8/2012 | Srikanth et al. |
| 2012/0221454 | A1 | 8/2012 | Morgan |
| 2012/0226796 | A1 | 9/2012 | Morgan |
| 2012/0226808 | A1 | 9/2012 | Morgan |
| 2012/0246248 | A1 | 9/2012 | Arita |
| 2012/0271949 | A1 | 10/2012 | Radhakrishnan et al. |
| 2012/0304191 | A1 | 11/2012 | Morgan |
| 2012/0311154 | A1 | 12/2012 | Morgan |
| 2013/0007195 | A1 | 1/2013 | Rinard et al. |
| 2013/0007265 | A1 | 1/2013 | Benedetti et al. |
| 2013/0014107 | A1 | 1/2013 | Kirchhofer |
| 2013/0054763 | A1 | 2/2013 | Van der Merwe et al. |
| 2013/0055251 | A1 | 2/2013 | Anderson et al. |
| 2013/0110943 | A1 | 5/2013 | Menon et al. |
| 2013/0139152 | A1 | 5/2013 | Chang et al. |
| 2013/0204994 | A1 | 8/2013 | Deshmukh et al. |
| 2013/0212160 | A1 | 8/2013 | Lawson et al. |
| 2013/0227137 | A1 | 8/2013 | Damola et al. |
| 2013/0318241 | A1 | 11/2013 | Acharya et al. |
| 2014/0059226 | A1* | 2/2014 | Messerli ............... G06F 9/5072 709/226 |
| 2014/0074539 | A1 | 3/2014 | Doering et al. |
| 2014/0074793 | A1 | 3/2014 | Doering et al. |
| 2014/0074999 | A1 | 3/2014 | Khalsa et al. |
| 2014/0075016 | A1 | 3/2014 | Chatterjee et al. |
| 2014/0075031 | A1 | 3/2014 | Doering et al. |
| 2014/0075032 | A1 | 3/2014 | Vasudevan et al. |
| 2014/0075033 | A1 | 3/2014 | Doering et al. |
| 2014/0082749 | A1 | 3/2014 | Holland et al. |
| 2014/0141743 | A1 | 5/2014 | Shaw |
| 2014/0201345 | A1 | 7/2014 | Abuelsaad et al. |
| 2014/0237502 | A1 | 8/2014 | Kelsen et al. |
| 2015/0067171 | A1 | 3/2015 | Yum et al. |
| 2015/0074279 | A1 | 3/2015 | Maes et al. |
| 2015/0227415 | A1 | 8/2015 | Alves et al. |
| 2015/0363724 | A1 | 12/2015 | Chatterjee et al. |
| 2015/0365301 | A1 | 12/2015 | Chatterjee et al. |

FOREIGN PATENT DOCUMENTS

| | | |
|---|---|---|
| CN | 104756460 A | 7/2015 |
| EP | 0538464 A1 | 4/1993 |
| EP | 2893683 A1 | 7/2015 |
| EP | 2893684 A1 | 7/2015 |
| EP | 2893685 A1 | 7/2015 |
| JP | 2015529366 A | 10/2015 |

(56) References Cited

FOREIGN PATENT DOCUMENTS

| | | |
|---|---|---|
| JP | 2015529367 A | 10/2015 |
| JP | 2016-500854 A | 1/2016 |
| WO | 2010151273 A1 | 12/2010 |
| WO | 2012070993 A1 | 5/2012 |
| WO | 2014039918 A1 | 3/2014 |
| WO | 2014039919 A1 | 3/2014 |
| WO | 2014039921 A1 | 3/2014 |
| WO | 2015191119 A1 | 12/2015 |

OTHER PUBLICATIONS

Bastos et al., Towards a Cloud-Based Environment for Space Systems Concept Design, Information Society (I-Society), International Conference on, IEEE, XP032224790, ISBN: 978-1-4673-0838-0, 2012, pp. 478-483.
Buyya, Cloud Computing Principles and Paradigms, 2011, 674 pages.
Chong, et al., ISVs are from Mars, and Hosters are from Venus, https://msdn.microsoft.com/en-us/library/bb891759.aspx, Nov. 2007, 28 pages.
Dan, et al., Web services on demand: WSLA-driven automated management, IBM Systems Journal vol. 43 Issue: 1, 2004, pp. 136-158.
Haslam, Virtualisation arrives for Exalogic 2—Details from Launch Event, http://www.veriton.co.uk!roller/fmw/entry/exalogic_2_details_from_launch, Jul. 26, 2012, 3 pages.
Keahey, et al., Virtual Workspaces for Scientific Applications, 2007, pp. 1-5.
Oracle, Identity Manager Design Console Guide, Release 9.1.0, Jun. 2008, 208 pages.
Paul et al., Architectures for the future networks and the next generation Internet: a survey, Computer Communications, Elsevier Science,Publishers BV, Amsterdam, NL,Department of Computer Science and Engineering, Washington University in Saint Louis. United States, XP027476826, ISSN: 0140-3664, DOI: 10.1016/J.COMCOM.2010.08.001 [retrieved on Jan. 15, 2010], 2011, pp. 2-42.
Ranganathan, Architecting the Oracle VM solution using the Oracle Sun ZFS Storage Appliances and Oracle Sun Servers, http://www.oracle.com/technetworklarticles/systems-hardware-architecture/vm-solution-using-zfs-storag e-1 74070.pdf, Sep. 2010, 18 pages.
International Application No. PCT/US2013/058638, International Preliminary Report on Patentability mailed on Jun. 12, 2015, 8 pages.
International Application No. PCT/US2013/058638, International Search Report and Written Opinion mailed on Jan. 8, 2014, 11 pages.
International Application No. PCT/US2013/058638, Written Opinion mailed on Apr. 22, 2015, 8 pages.
International Application No. PCT/US2013/058639, International Preliminary Report on Patentability mailed on Sep. 24, 2015, 8 pages.
International Application No. PCT/US2013/058639, International Search Report and Written Opinion mailed on Jan. 8, 2014, 10 pages.
International Application No. PCT/US2013/058639, Written Opinion mailed on Jul. 7, 2015, 6 pages.
International Application No. PCT/US2013/058642, International Preliminary Report on Patentability mailed on Jan. 20, 2015, 10 pages.
International Application No. PCT/US2013/058642, International Search Report & Written Opinion mailed on Feb. 7, 2014, 17 pages.
International Application No. PCT/US2013/058642, Invitation to Pay Add'l Fees mailed on Dec. 5, 2013, 5 pages.
International Application No. PCT/US2013/058642, Invitation to restrict or pay additional fees mailed on Jul. 23, 2014, 3 pages.
International Application No. PCT/US2013/058642, Written Opinion mailed on Sep. 11, 2014, 8 pages.
International Application No. PCT/US2015/016214, International Search Report and Written Opinion mailed on May 11, 2015, 11 pages.
U.S. Appl. No. 13/835,307, Non-Final Office Action mailed on Feb. 18, 2015, 12 pages.
U.S. Appl. No. 13/835,307, Notice of Allowance mailed on Jul. 7, 2015, 5 pages.
U.S. Appl. No. 13/836,625, Non-Final Office Action mailed on Jun. 19, 2015, 41 pages.
U.S. Appl. No. 13/840,943, Non-Final Office Action mailed on Dec. 18, 2014, 10 pages.
U.S. Appl. No. 13/840,943, Notice of Allowance mailed on Jun. 29, 2015, 10 pages.
U.S. Appl. No. 13/844,018, Final Office Action mailed on Dec. 14, 2015, 21 pages.
U.S. Appl. No. 13/844,018, Non-Final Office Action mailed on Jun. 11, 2015, 27 pages.
U.S. Appl. No. 13/907,616, Non-Final Office Action mailed on Dec. 4, 2015, 9 pages.
U.S. Appl. No. 13/907,689, Advisory Action mailed on Aug. 12, 2015, 2 pages.
U.S. Appl. No. 13/907,689, Final Office Action mailed on May 21, 2015, 12 pages.
U.S. Appl. No. 13/907,689, Non-Final Office Action mailed on Jan. 7, 2015, 11 pages.
U.S. Appl. No. 13/907,689, Non-Final Office Action mailed on Sep. 16, 2015, 17 pages.
U.S. Appl. No. 13/907,728, Final Office Action mailed on Dec. 17, 2015, 16 pages.
U.S. Appl. No. 13/907,728, Non-Final Office Action mailed on Jul. 2, 2015, 14 pages.
U.S. Appl. No. 13/836,625, Final Office Action mailed Jan. 13, 2016, 46 pages.
U.S. Appl. No. 13/836,625, Non-Final Office Action mailed on Nov. 18, 2016, 41 pages.
U.S. Appl. No. 13/907,616, Notice of Allowance mailed on Nov. 14, 2016, 10 pages.
International Application No. PCT/US2015/016214, International Preliminary Report on Patentability mailed on Sep. 19, 2016, 6 pages.
"Customizing Deployment Procedures" *Oracle® Enterprise Manager Lifecycle Management Administrator's Guide E27046-33*, pp. 51-1 to 51-19 (Jun. 2015).
U.S. Appl. No. 14/624,356, Non-Final Office Action mailed on Sep. 15, 2016, 9 pages.
U.S. Appl. No. 13/907,728, Notice of Allowance mailed on Aug. 25, 2016, 13 pages.
Oracle White Papers, Delivering Database as a Service (DBaaS) using Oracle Enterprise Manager 12c, Available online at:URL:http://www.oracle.com/technetwork/oem /cloud-mgmt/dbaasoverview-wp-1915651.pdf, Oct. 2013, 21 pages.
European Application No. 13766777.0, Office Action mailed on Feb. 10, 2016, 5 pages.
International Application No. PCT/US2015/016214, Written Opinion mailed on Jun. 3, 2016, 5 pages.
U.S. Appl. No. 13/844,018, Notice of Allowance mailed on Jul. 14, 2016, 9 pages.
U.S. Appl. No. 13/907,616, Final Office Action mailed on Jun. 28, 2016, 9 pages.
U.S. Appl. No. 13/907,689, Notice of Allowance mailed on Apr. 22, 2016, 8 pages.
"World of Warcraft: Cataclysm Can Run When It Is Partially", downloaded from URL:https://zhidao.baidu.comiquestion/315386072.html, (Sep. 3, 2011) 1 page.
China Patent Application No. CN201380046472.4 , Office Action mailed on Feb. 20, 2017, 25 pages.
U.S. Appl. No. 14/624,356, Final Office Action mailed on Mar. 13, 2017, 13 pages.

\* cited by examiner

ROLE-DRIVEN NOTIFICATION SYSTEM INCLUDING SUPPORT FOR COLLAPSING COMBINATIONS

CROSS-REFERENCES TO RELATED APPLICATIONS

This application is a continuation of, and claims the benefit and priority of application Ser. No. 13/835,307, filed Mar. 15, 2013, entitled "ROLE-DRIVEN NOTIFICATION SYSTEM INCLUDING SUPPORT FOR COLLAPSING COMBINATIONS," which claims the benefit and priority under 35 U.S.C. 119(e) of the following applications, the entire contents of which are incorporated herein by reference for all purposes:
(1) U.S. provisional Application No. 61/698,413, filed on Sep. 7, 2012, entitled TENANT AUTOMATION SYSTEM;
(2) U.S. provisional Application No. 61/698,459, filed on Sep. 7, 2012, entitled SERVICE DEVELOPMENT INFRASTRUCTURE; and
(3) U.S. provisional Application No. 61/785,299, filed on Mar. 14, 2013, entitled CLOUD INFRASTRUCTURE.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

SUMMARY

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

One embodiment of the invention relates to a method of implementing role-driven notification. The method includes storing, by a cloud infrastructure system including computing devices, notification templates. Each of the notification templates is associated with a role. The method further includes determining that a user is associated with a first role and a second role, determining that the first role is associated with a first notification template and the second role is associated with a second notification template. Further, the method includes combining the first template and the second template to generate a third template, based on the third template, generating a notification. The method then, sends the notification to the user.

The method further includes combining of the first notification template and the second notification template by removing any of the notification information from the first notification template of the second notification template that is redundant. Further, the third notification template comprises the least amount of notification information necessary from the first and second notification templates, and roles are arranged in a roles hierarchy.

The notification templates are arranged in a template hierarchy which maps to the roles hierarchy, and the method includes determining a location of the user in the role hierarchy and the notification hierarchy, based on the location, collapsing each child notification templates below the location in the hierarchy into a single collapsed template, and based on the single collapsed template, generating a collapsed notification, wherein the collapsed notification includes the fewest number of notifications location within the role hierarchy.

The roles in the hierarchy of roles overlap, restrictions are associated with one or more of the roles which restricts one or more of the notification information from being included in the notification, the templates are pre-registered and the combining occurs before runtime, and the notification information for each of the notification templates are stored in XML and the association of a role with a notification template is stored in metadata.

In a further embodiment, a cloud infrastructure system for implementing role-driven notification, is described. The system includes a processor, and a storage device including sets of instructions stored thereon. When executed by the processor the instructions cause the processor to store notification templates. Each of the notification templates is associated with a role. The instructions further cause the processor to determine that a user is associated with a first role and a second role, determine that the first role is associated with a first notification template and the second role is associated with a second notification template, combine the first template and the second template to generate a third template, and based on the third template, generate a notification. The notification includes notification information from the first template and the second template. Then the processor sends the notification to the user.

In yet another embodiment, a non-transitory computer-readable medium for implementing role-driven notifications having sets of instructions stored thereon, is described. When the instructions are executed by a computer, the computer is caused to store a notification templates. Each of the notification templates is associated with a role. The instructions further cause the computer to determine that a user is associated with a first role and a second role of the plurality of roles, determine that the first role is associated with a first notification template and the second role is associated with a second notification template, combine the first template and the second template to generate a third template, based on the third template, generate a notification. The notification includes notification information from the first template and the second template. Then, the computer sends the notification to the user.

BRIEF DESCRIPTION OF THE DRAWINGS

Illustrative embodiments of the present invention are described in detail below with reference to the following drawing figures.

DETAILED DESCRIPTION

Figure 1A:
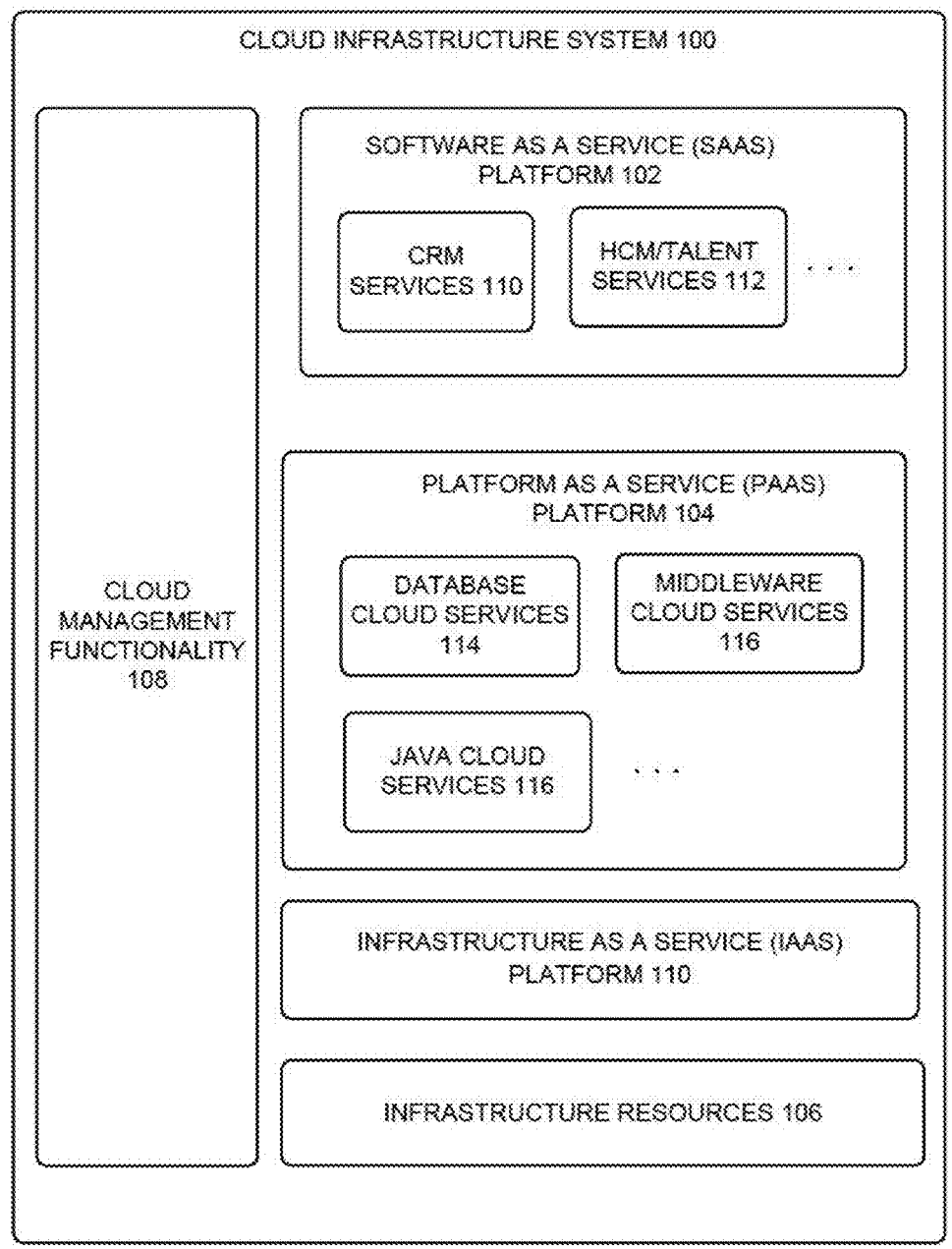
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
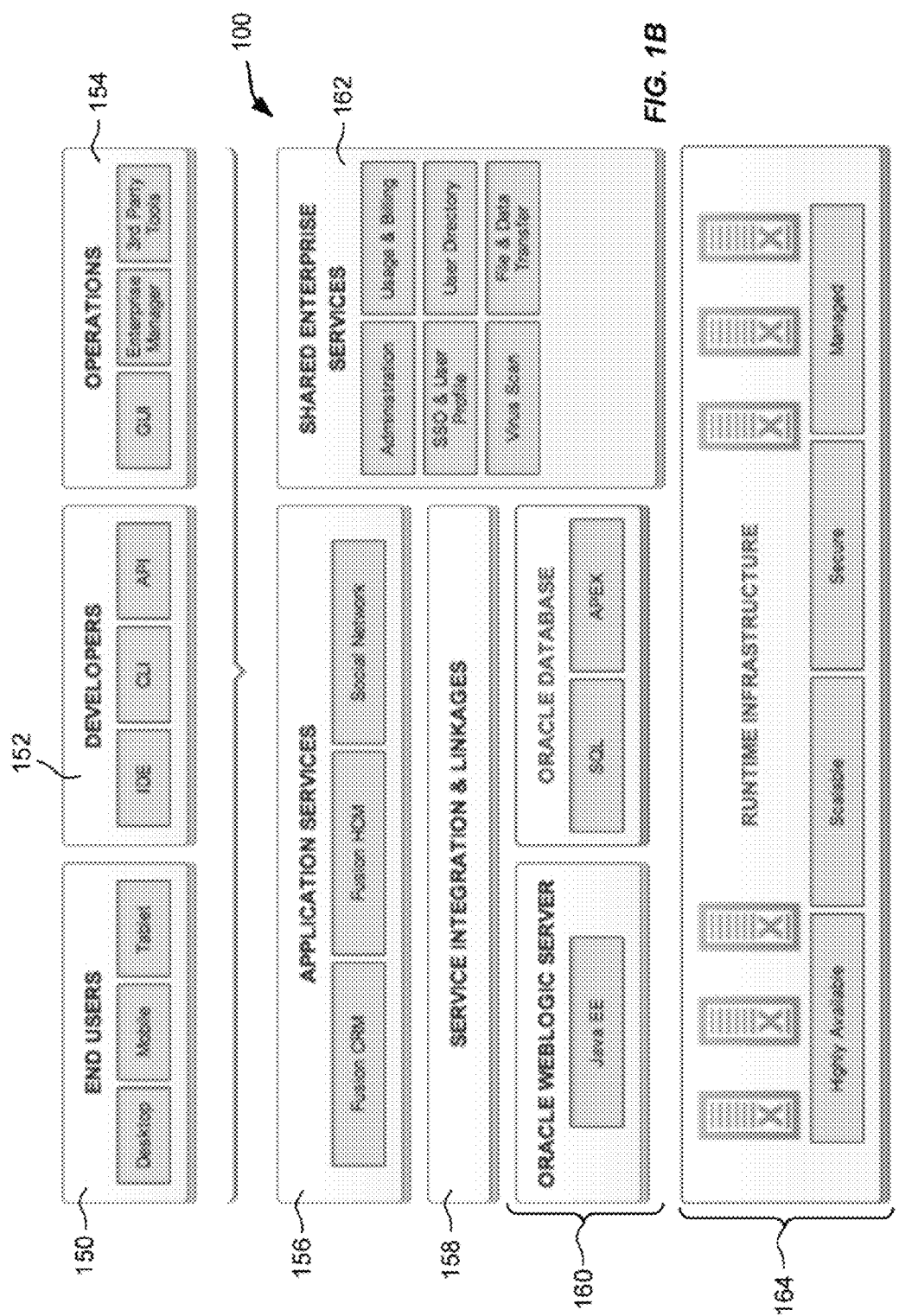
FIG. 1B is a simplified block diagram of a hardware/software stack that may be used to implement a cloud infrastructure system according to an embodiment of the present invention.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
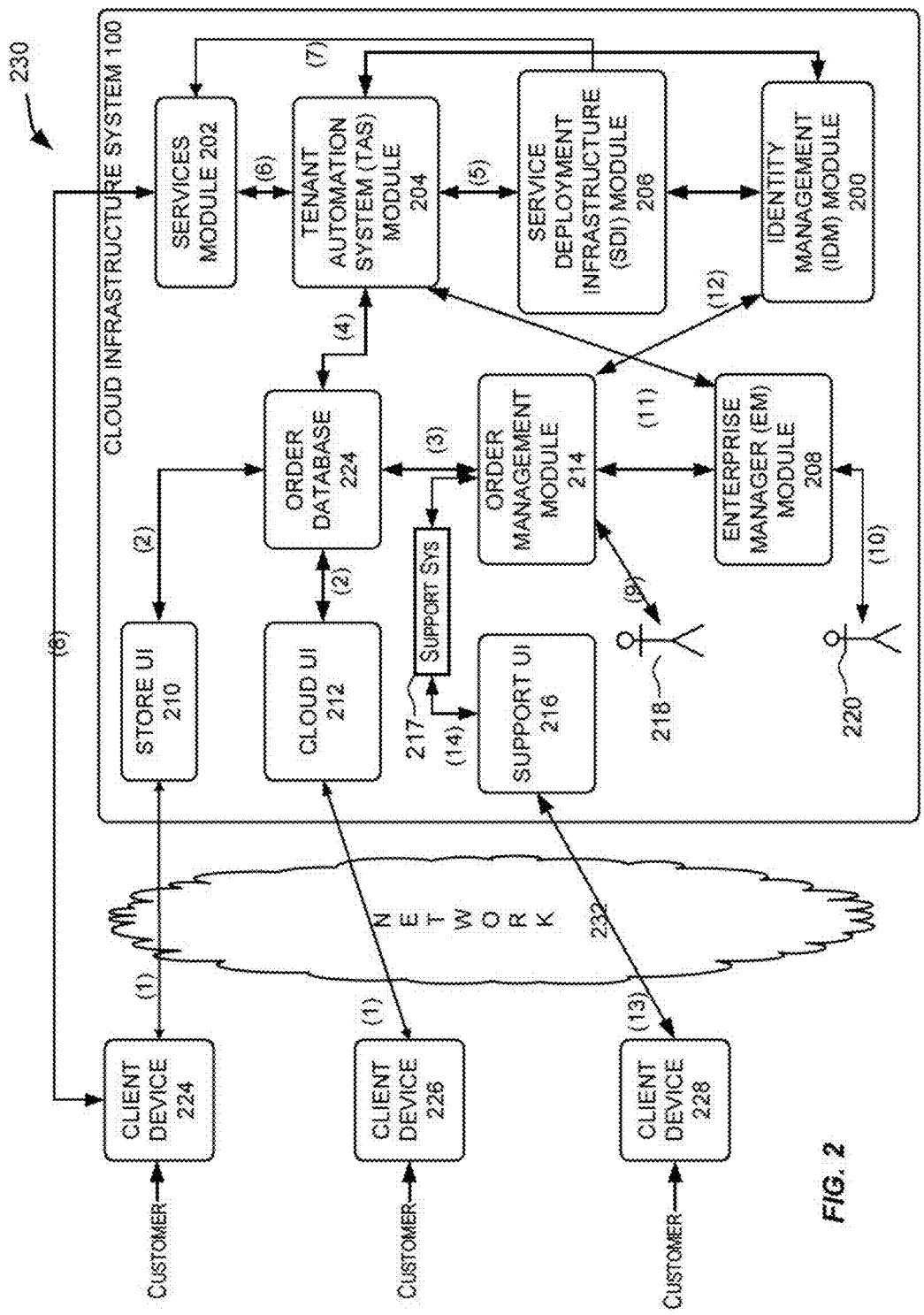
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
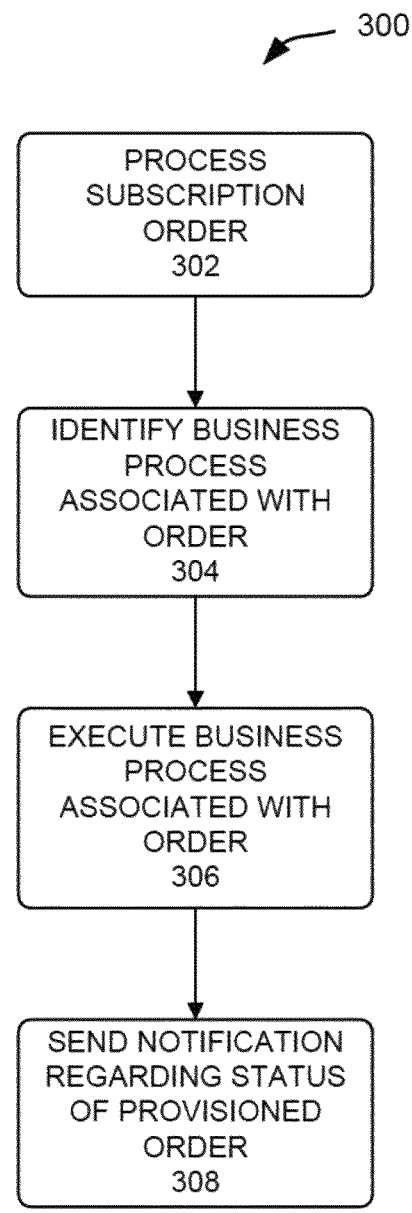
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
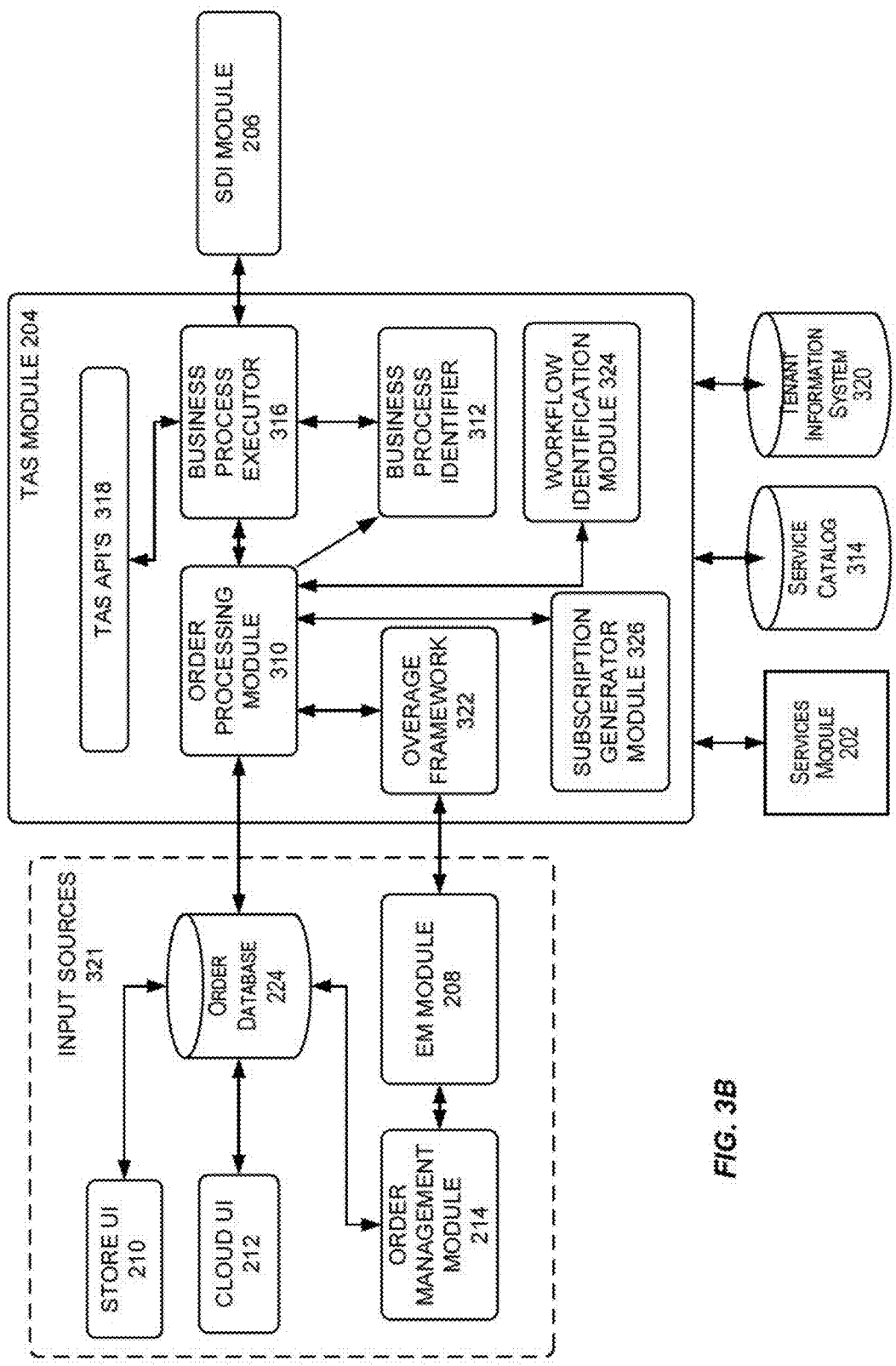
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
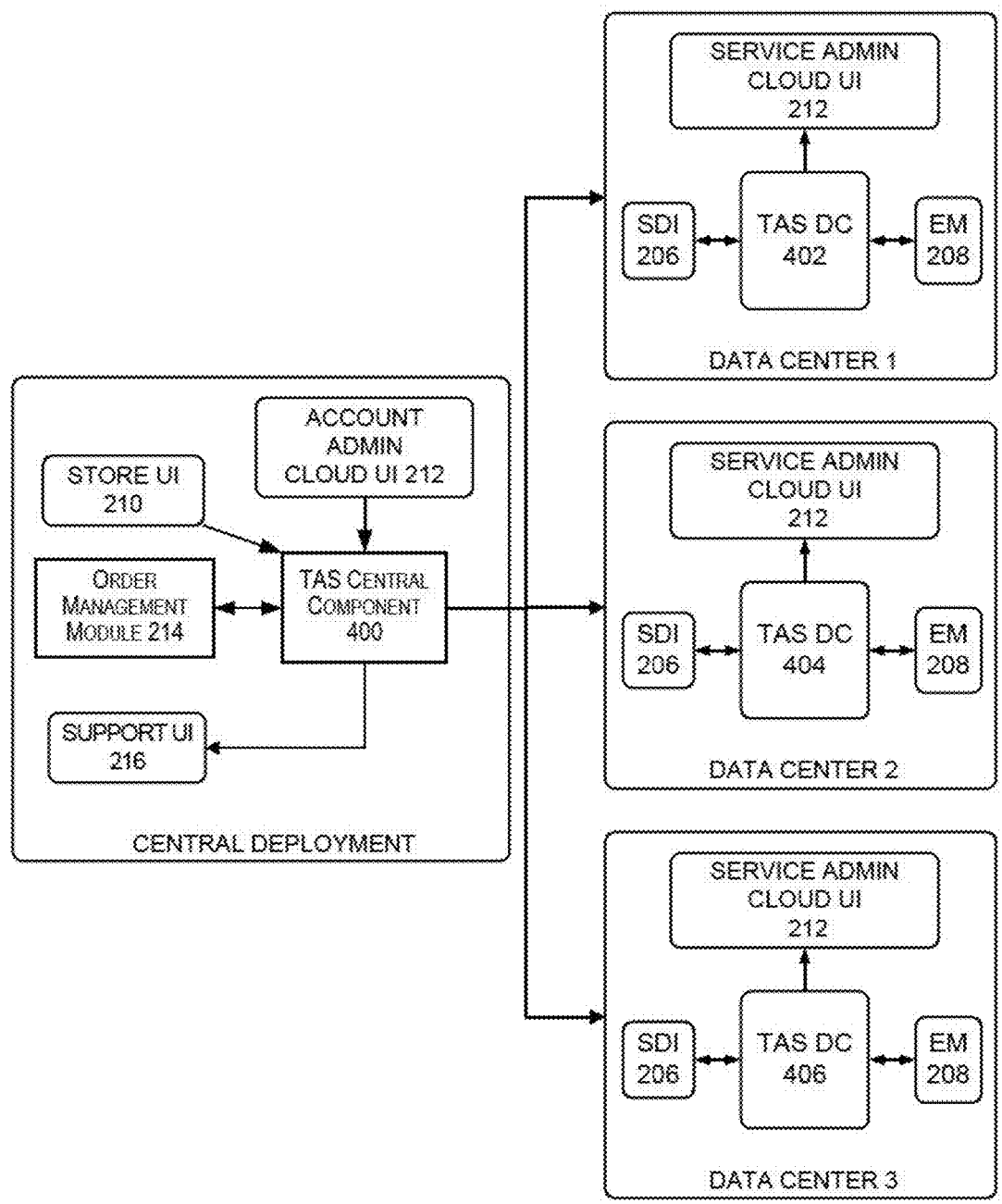
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
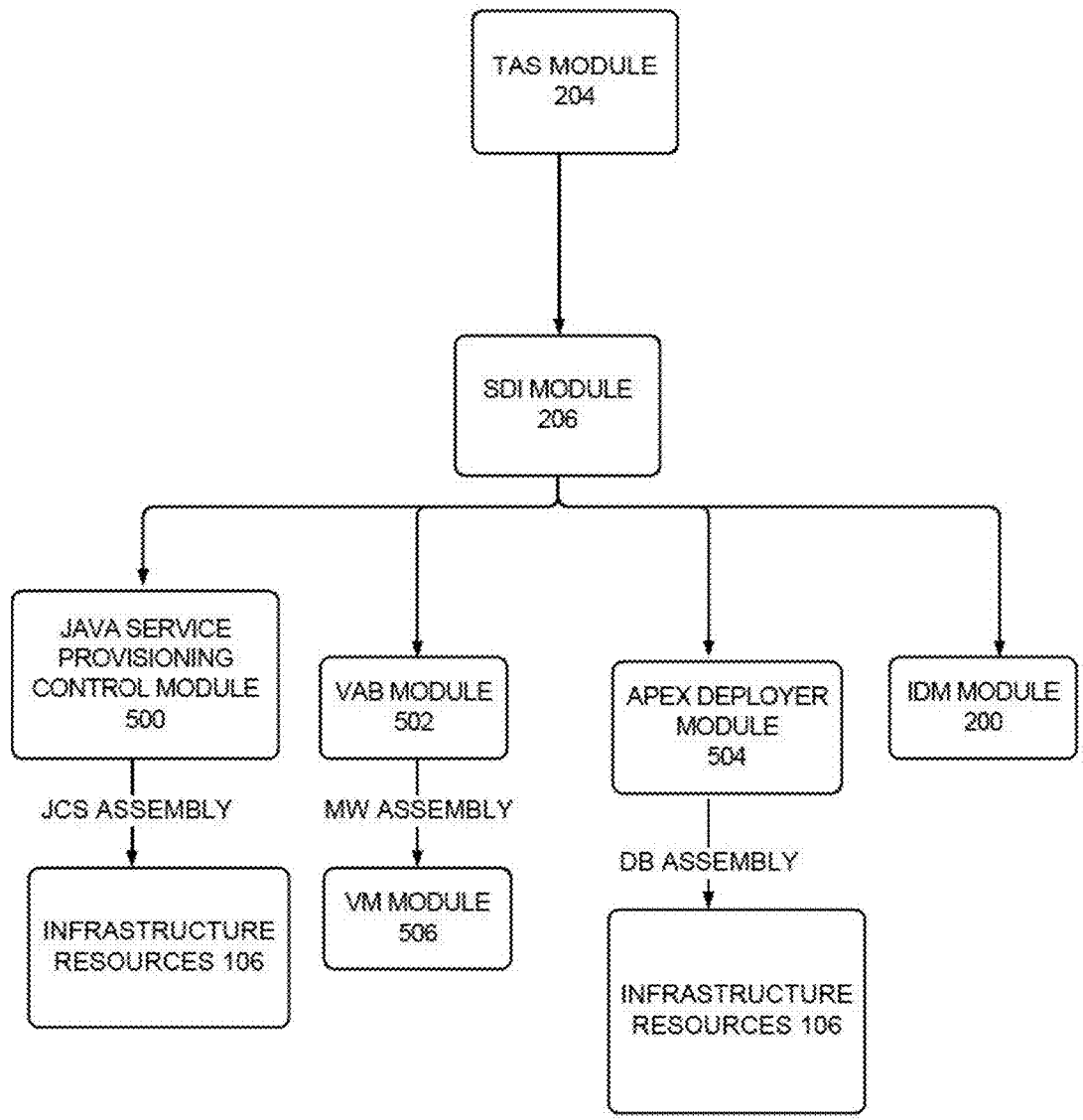
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
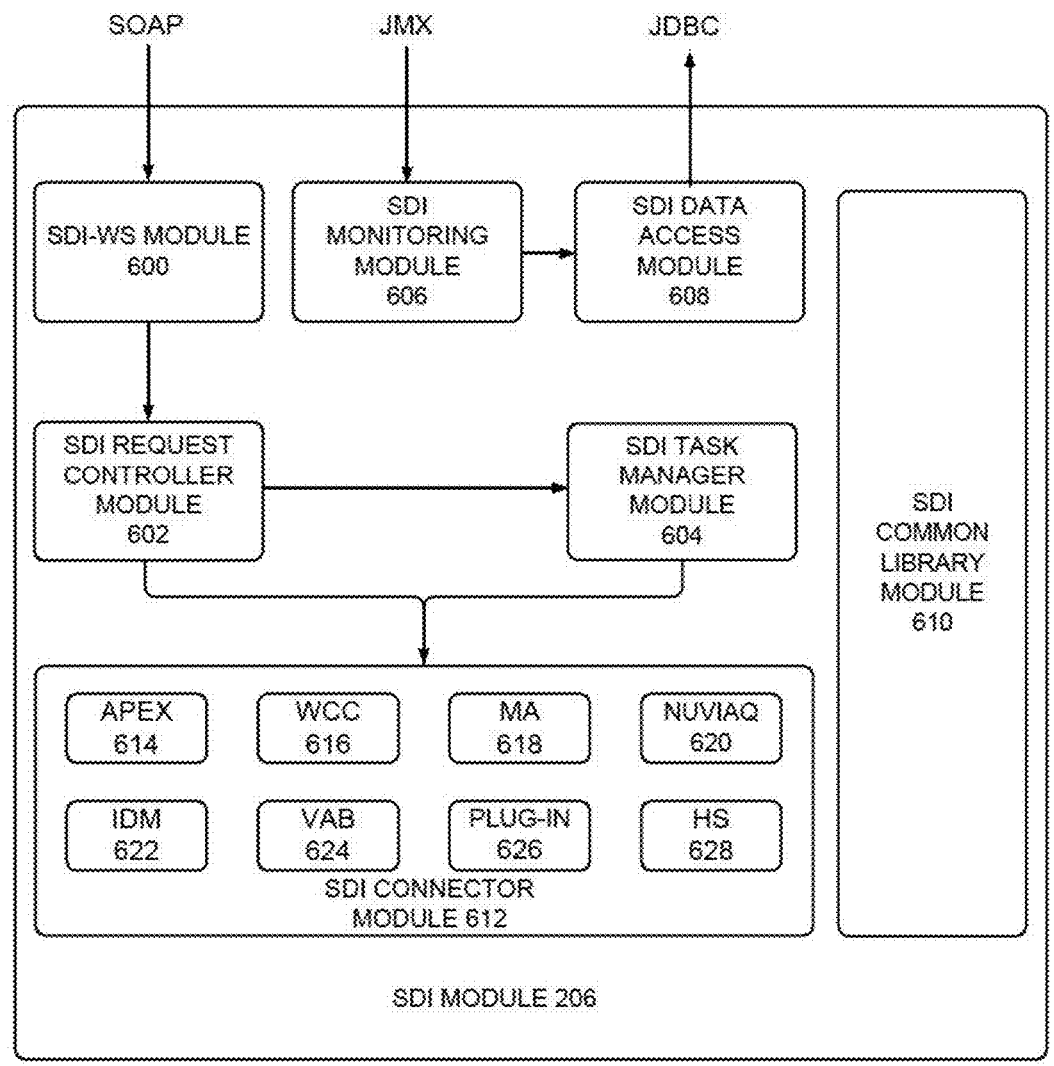
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
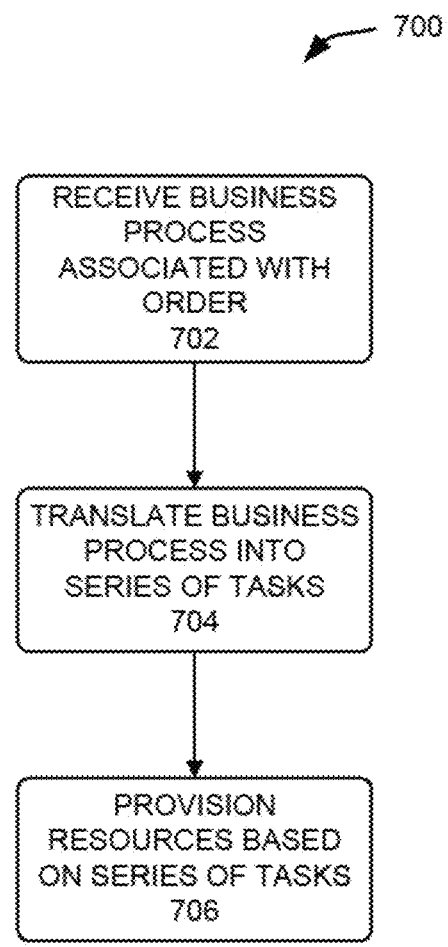
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
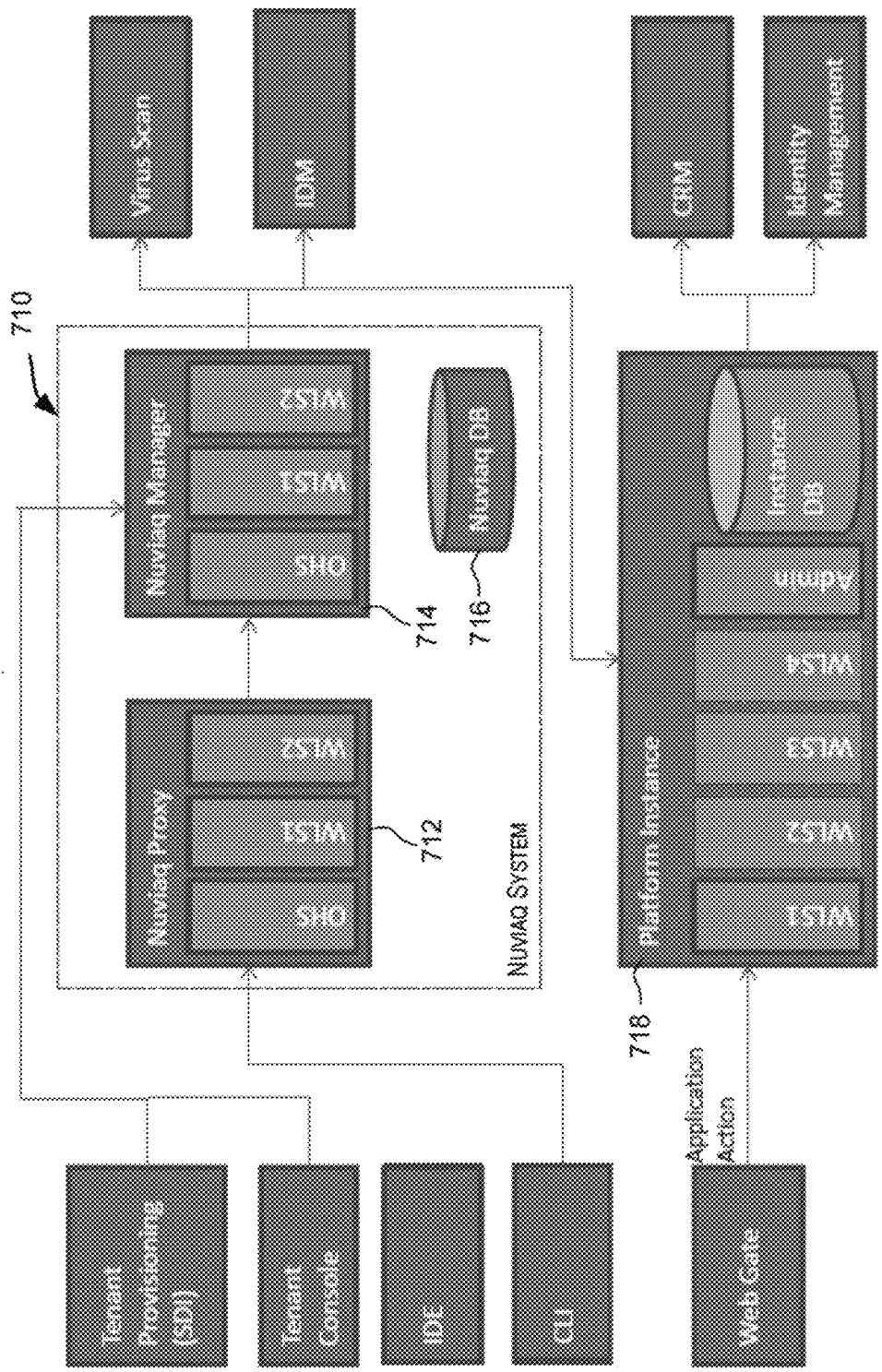
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, un-deploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant.

These properties may include for example:
Property#1: oracle.cloud.service.weblogic.size
  Values: BASIC, STANDARD, ENTERPRISE
  Description: Specifies the subscription type. This impacts the number of servers, database limits and quality of service settings.
Property#2: oracle.cloud.service.weblogic.trial
  Values: TRUE, FALSE
  Description: Indicates whether or not this is a trial subscription.
Property#3: oracle.cloud.service.weblogic.crm
  Values: CRM Service ID
  Description: Identifies a CRM service to be associated with this WebLogic service instance.

Figure 7C:
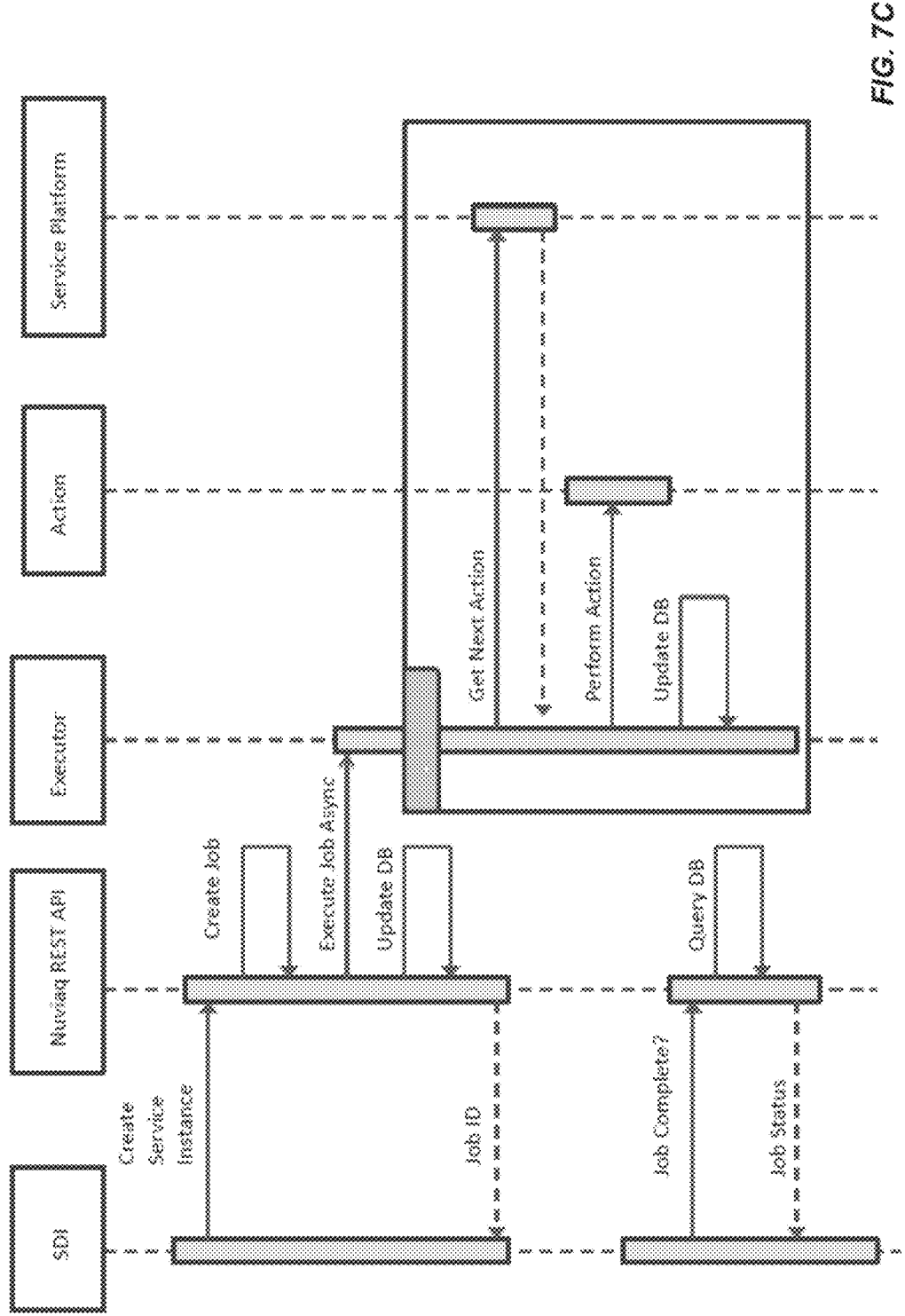
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:
Property: oracle.cloud.service.weblogic.state
Values: RUNNING, STOPPED
Description: Specifies the initial state of the application after deployment.

Figure 7D:
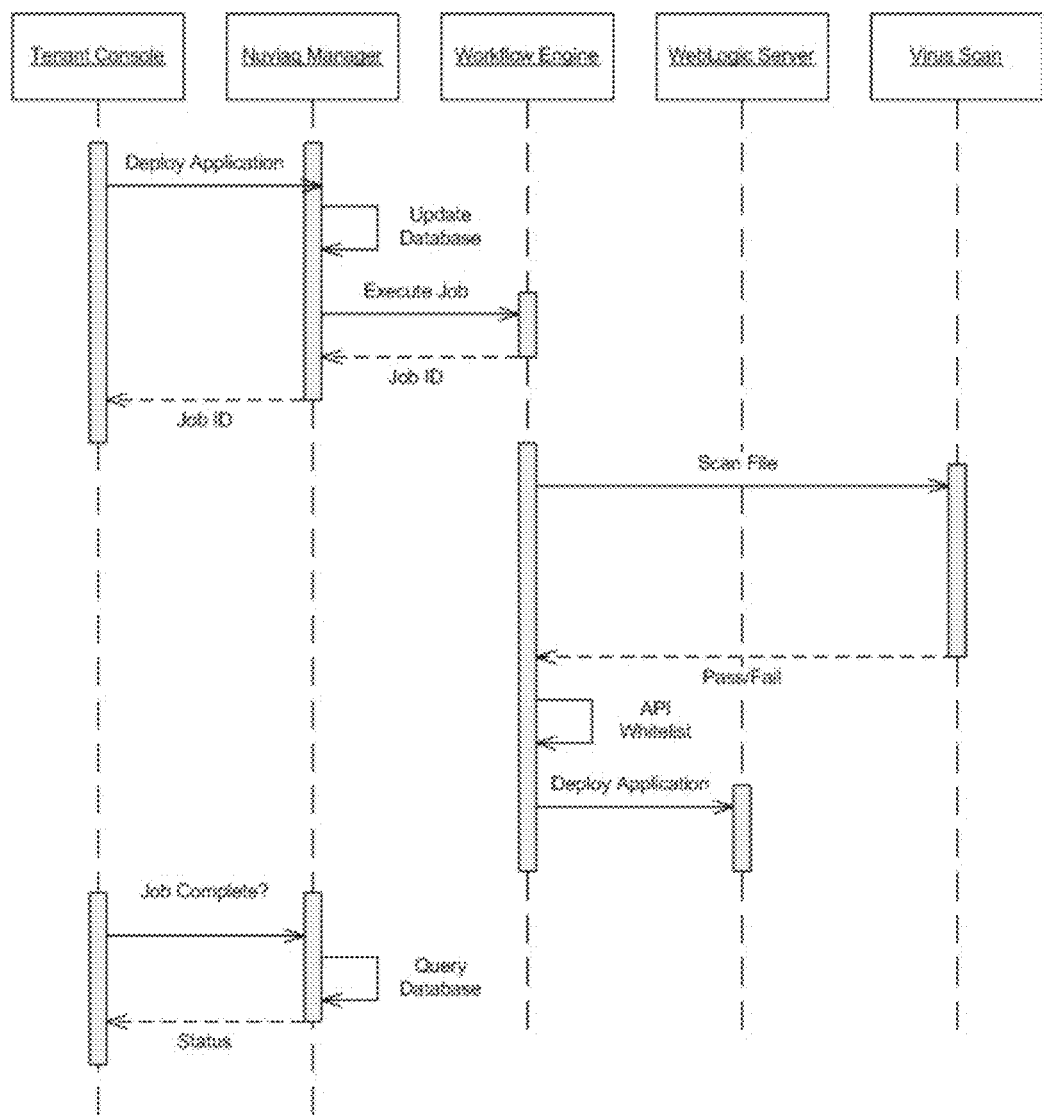
FIG. 7D depicts TAS 204 and SDI 206 working in cooperation are responsible for provisioning resources for one or more services ordered by a customer from a set of services offered by the cloud infrastructure system according to an embodiment of the present invention.

FIG. 7D depicts TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

Figure 7E:
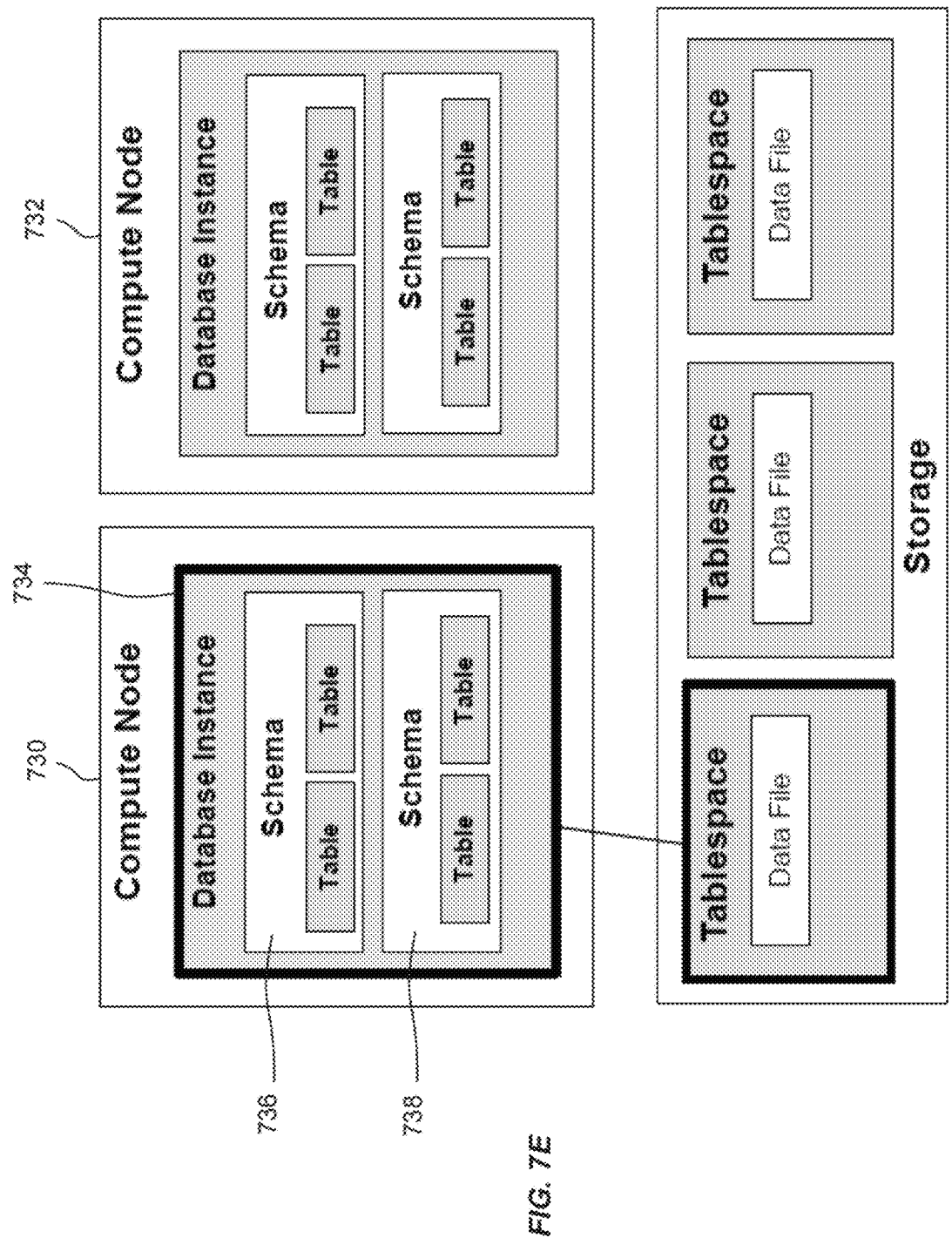
FIG. 7E depicts an example sequence diagram illustrating steps of a deployment process using a Nuviaq system according to an embodiment of the present invention.

FIG. 7E depicts an example sequence diagram illustrating steps of a deployment process using a Nuviaq system according to an embodiment of the present invention. The sequence diagram depicted in FIG. 7E is only an example and is not intended to be limiting.

Accordingly, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI 212 to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7F:
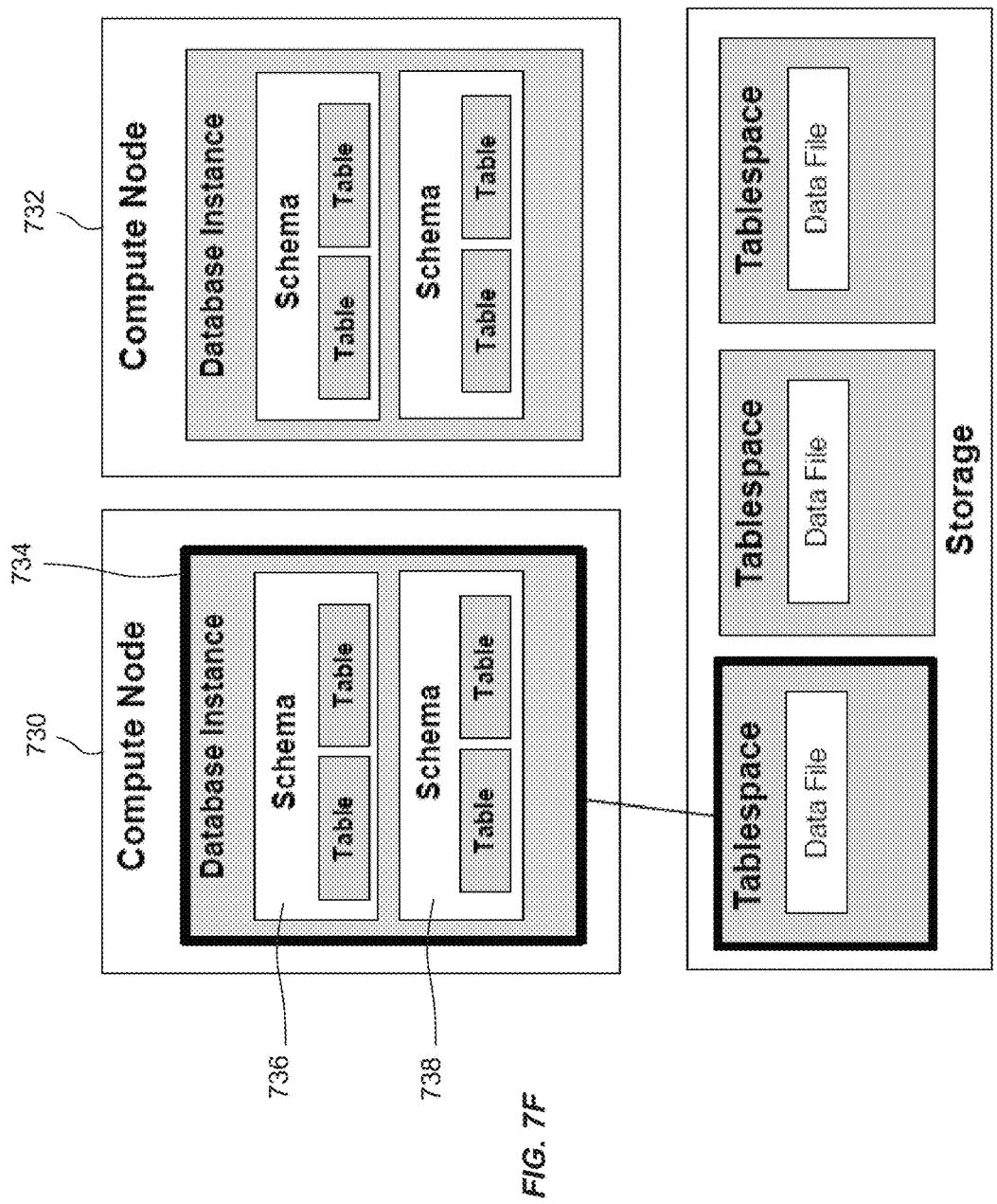
FIG. 7F depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7F in one embodiment. FIG. 7F depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7F, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7F, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler. Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

According to a further embodiment, TAS and SDI support a role-driven notification system including support for collapsing combinations. For example, according to the role-driven notification system, notifications from TAS are tied to roles (e.g., buyer, account administrator, service administrator, identity domain administrator, etc.). Different roles may be registered to receive information about different events in the system (e.g., new order processing, trial termination, underutilization, etc.). For a given type of event, different templates may be used to restrict the details for a particular role (e.g., only a service administrator is provided with temporary security credentials).

Further, according to the collapsing combinations embodiment, if a user possesses multiple roles, role combinations are considered to select collapsed templates covering all details relevant to that user. This avoids duplicate role-specific notifications for the same logical event. There may also exist a hierarchy of roles which may include overlapping roles.

In some embodiments, the logic to trigger a notification is decoupled from the logic used to determine who should receive the notification and the content of the notification. In one embodiment, SDI and TAS implement this system using a mapping strategy for different roles and associated notifications. For example, a single user might have different roles, and a notification subsystem knows which notifications the single user should receive using a customized notification mapping. Based upon the roles of the user, different combinations of notifications may be provided to the user.

Furthermore, the SDI may return metadata about the services and the environment to TAS, and TAS then uses the metadata to notify the customer and trigger a notification event.

Notification Service:

Customer notifications may be handled by the TAS-NS. TAS-NS provides rich notification services tailored to the TAS environment. While individual components could easily send simple e-mail messages on their own, the TAS-NS frees these components from having to address details of formatting, localization, content revision, and auditing. Instead, components can focus on defining the abstract notifications they need to send out and the runtime variable data that accompanies individual notifications.

Since it is desirable to send a single email notification to the relevant users (e.g., a user, a customer, a buyer, a tenant administrator, a service administrator) with details of all the subscribed services in a given order, the TAS system waits until all service subscription responses are received from TAS module 204 for all order payloads before it sends email notifications. It consolidates all service subscription details into one or more emails (based on the distinct set of recipients) and delivers them to the recipients.

A notification template is used for specific notification scenarios such as an order processed notification, a trial about to terminate notification, etc. These templates can be used to tailor the notification messages and actions corresponding to such events.

Further, there may be a hierarchy of roles which may or may not include overlapping roles, and the same user may have multiple roles. In one embodiment, restrictions may be placed on what can be sent to particular roles. Also, the notification system 805 may collapse notifications into the fewest number of notifications. Further, hybrid combinations may be generated and the blending of these hybrid notifications may occur before runtime, based on privileges or pre-registration.

Figure 8:
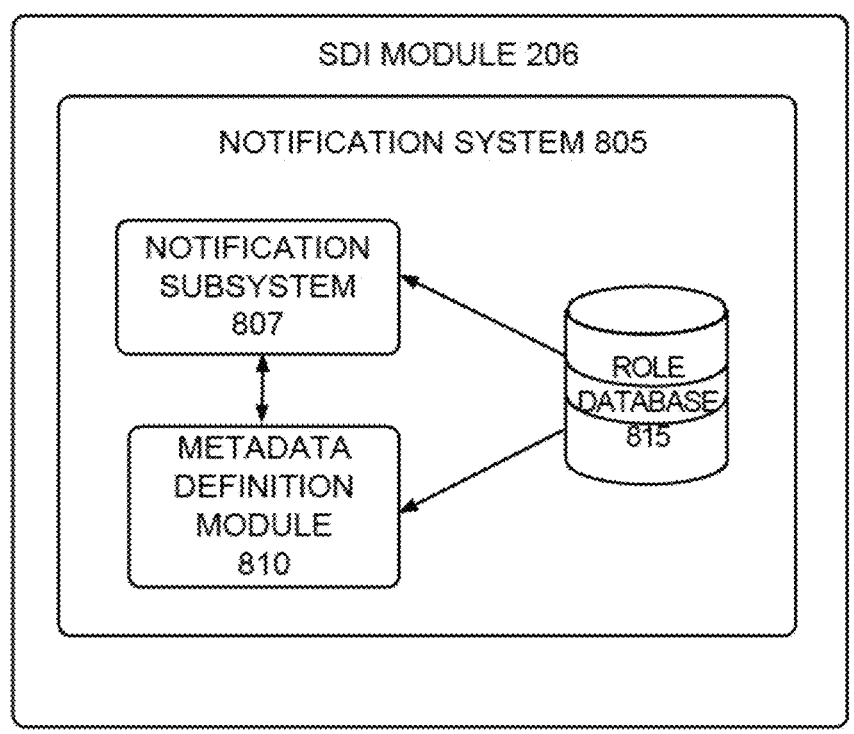
FIG. 8 depicts a simplified block showing processing that may be performed by a notification system within the TAS module, in accordance with an embodiment of the present invention.

Turning now to FIG. 8, which illustrates a system 800 for processing notifications, in accordance with an embodiment of the present invention. In one embodiment, system 800 may include the TAS module 204 (within the cloud infrastructure system 100) which includes the notification system 805. Further, the notification system 805 may include a notification subsystem 807, a metadata definition module 810, and a role database 815.

Within the cloud infrastructure system 100, overlapping roles may exist. In one embodiment, overlapping roles are roles that essentially include all of the privileges of other roles. For example, an identity domain administrator which generally has all of the roles of a service administrator, whereas an account administrator does not have all of the roles of either a service administrator or an identity domain administrator. Thus, the customer has access to the services associated with the role system for which the customer has initially signed up.

In a practical application, for a given customer signed up for a service, that customer may be the account administrator, the identity domain administrator, and the service administrator. In other words, a single customer (or user) may have any number of overlapping roles.

In one embodiment, support may need to be fairly flexibly in the software in order to accommodate for the situation where there is a very fine grained mapping of each cloud infrastructure system 100 defined role that is literally a different person in an organization, and so messages are sent out in some cases with fairly narrowed notifications. For example, the account administrator should not see the passwords (or probably does not care to see them) or URLs for a particular service and instead the account administrator is only interested in knowing that certain customers signed up for certain services (i.e., the account administrators are not concerned with the specifics of the allocations, but only which customers are allocated).

On the other hand, a service administrator for a particular service would desire to see the URLs, the SFTP account information, passwords, etc. for the particular service, but would not want to see that same information for another service for which he/she is not the service administrator.

Therefore, in order to avoid sending notifications (i.e., emails, SMS, etc.) which are not needed (or desired) by certain customers, a layer of software is generated to handle blending/collapsing (or filtering/restricting) of notification inside the notification system 805. As such, notifications are abstractly collapsed into the fewest possible notifications if a user has multiple roles (this role information is stored in the role database 815). So in particular, instead of getting two different notifications when the user is onboarding (i.e., if the user is the account administrator and the identity domain administrator), only one notification is sent. Further, that notification would be a hybrid combination of the content of the two separate notifications.

In one embodiment, this may be achieved by pre-registering templates that match a desired layout. Accordingly, a number of various combinations are registered, and the software and the automation systems that are sending out the notification are triggered by the abstract events, and then a notification subsystem 807 will determine based on the recipients and the type of the templates which are generated, whether or not collapsing is possible and what set of notifications to send to a particular user.

Further, each role has an associated notification template. Therefore, if a user is registered as both the account administrator and the identity domain administrator for a service, then when notifications are generated the notification template for the account administrator and the notification the template for the identity domain administrator will be analyzed and a third notification template will be generated. This third notification template will be a combination of the other two templates, and will include the information in a single notification for both roles. Further, metadata for each template is maintained by the metadata definition data module 810 to be used when determining how to blend the notifications.

As such, the notification subsystem 807 is not concerned with whether there are three templates underneath, one template, or N templates. The notification subsystem 807 simply logically triggers a notification to the set of users with the particular roles, with a reference to the pieces of metadata necessary to generate the blended notification. Therefore, how that maps into sets of templates, discreet messages, or collapsed messages is hidden from the notification subsystem 807. Accordingly, the notification event itself is decoupled from the actual templates used to fulfill the notifications.

In one embodiment, registration of a template or a combination templates may be automated. For example, if roles A and B exist, and now a combination of the notifications for roles A and B is needed, then the combination can be generated automatically. This may be done using XML to generate a template pack, which is a combination of XML files and metadata files used to form the combined template. Thus, new combinations or templates can be registered using that metadata format. Therefore, if role A and role B exist, and there is a template for role A and a template for role B, but no pre-registered template for a combination of role A and role B; then once it is determined that a user is both role A and role B, at that point, a combination template for role A plus role B may be automatically generated for future use by the notification subsystem 807. As such, the notification information for each of the notification templates is stored in XML and the association of a role with a notification template is stored in metadata.

Figure 9:
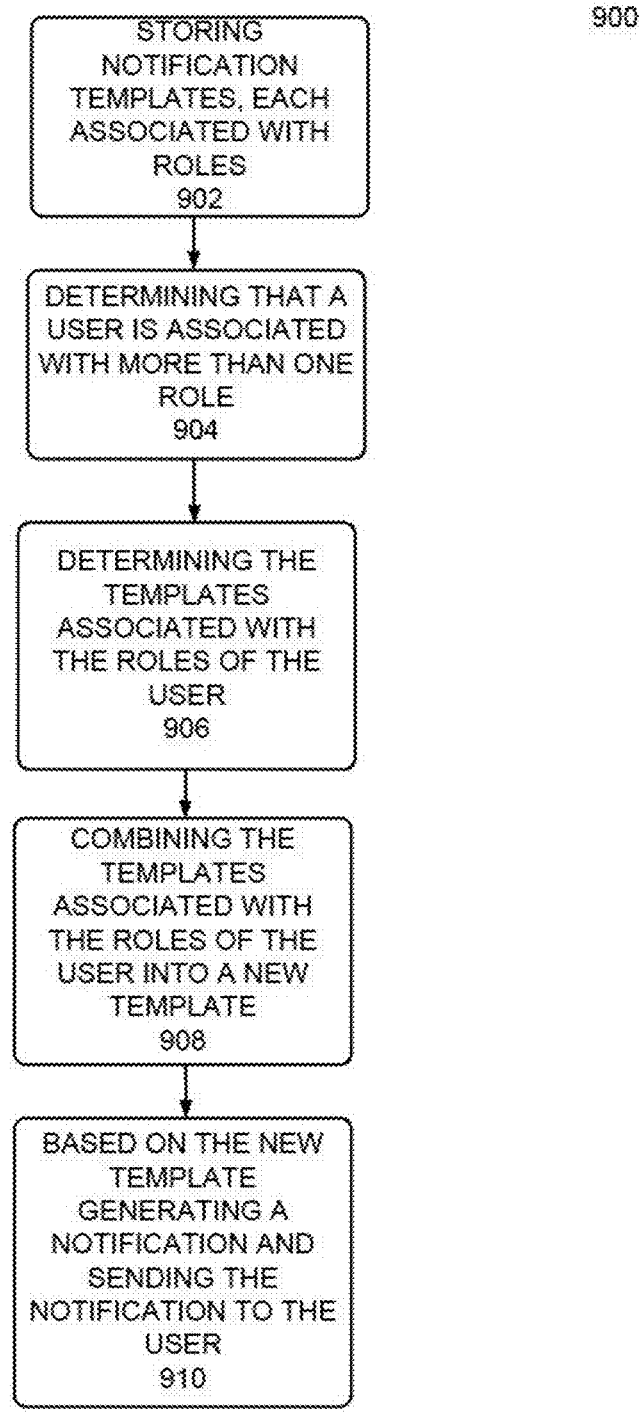
FIG. 9 depicts a simplified flowchart showing processing that may be performed by a notification system within the TAS module, in accordance with an embodiment of the present invention.

Turning now to FIG. 9, which illustrates a method 900 showing processing that may be performed by a notification system within the SDI module, in accordance with an embodiment of the present invention. At 902, notification templates which are each associated with roles are stored. At 904, a determination is made that a user is associated with more than one role. Then, a determination is made of which of the templates are associated with the roles of the user (906).

Further, at 908, the templates associated with the roles of the user are combined into a new template. At 910, based on the new template, a notification is generated and the notification is sent to the user.

Figure 10:
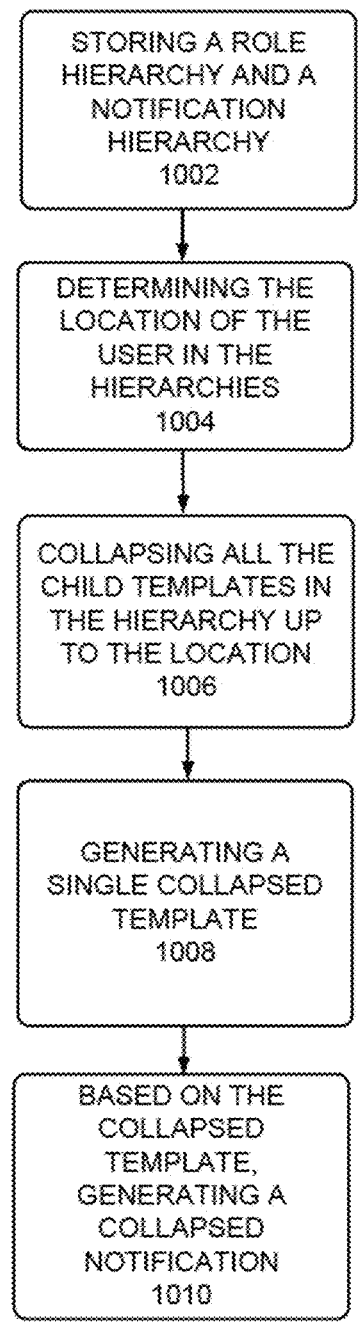
FIG. 10 depicts a simplified flowchart diagram showing processing that may be performed by a notification system within the TAS module, in accordance with another embodiment of the present invention.

Referring next to FIG. 10, which illustrates a method 1000 which showing processing that may be performed by a notification system within the SDI module, in accordance with another embodiment of the present invention. At 1002, a role hierarchy and a notification hierarchy are stored. A determination is made of the location of the user in the hierarchies (1004). For example, the role hierarchy may have 10 levels and the user may be at level 5. Therefore, the user has 4 "child" roles below him/her in the hierarchy. The notification hierarchy would work in a similar manner.

At 1006, all the child templates in the hierarchy up to the location of the user in the hierarchy are collapsed, and a single collapsed template is generated based on the template information from each of the children and the use level of the hierarchy (1008). At 1010, based on the collapsed template a collapsed notification is generated. Accordingly, the fewest notifications will then be sent to the user, based on the level in the role hierarchy of the user.

Figure 11:
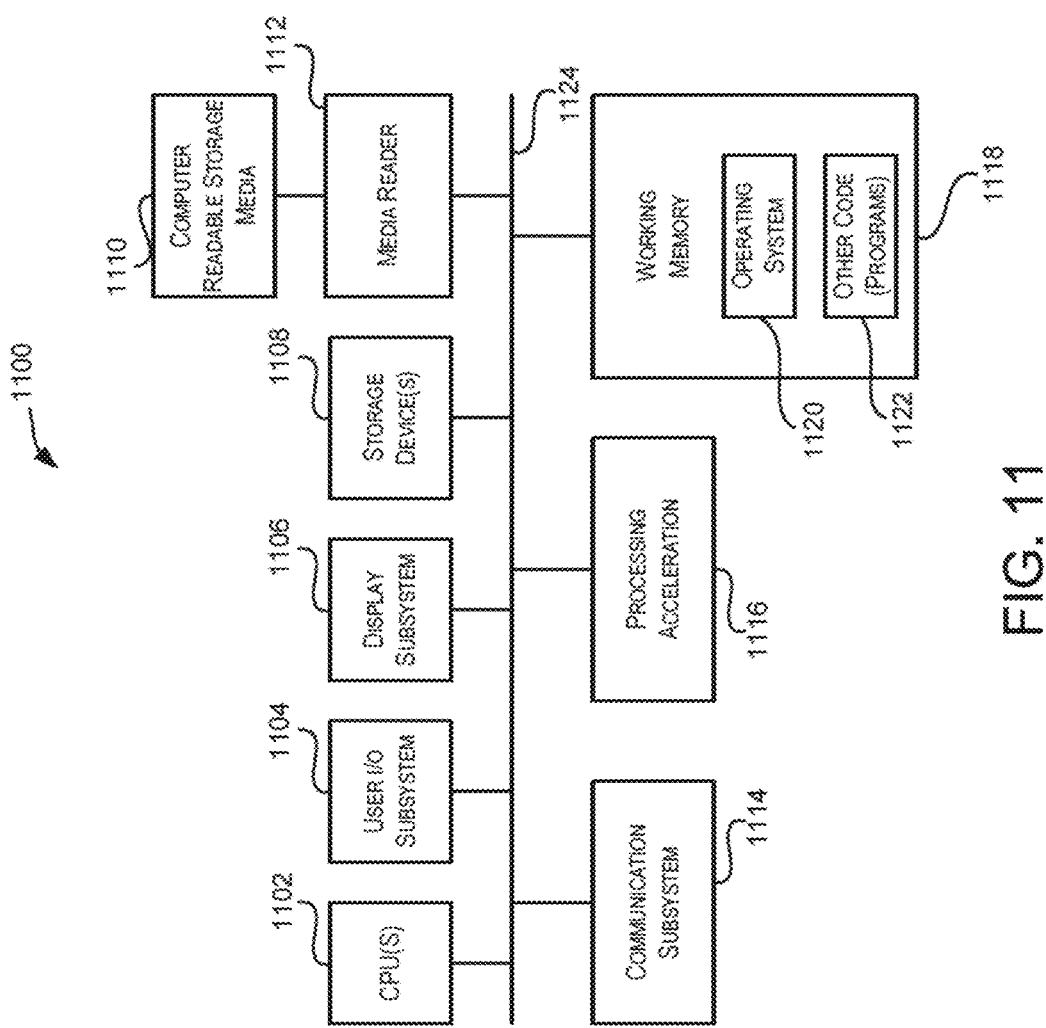
FIG. 11 is a simplified block diagram of a computing system 1000 that may be used in accordance with embodiments of the present invention.

FIG. 11 is a simplified block diagram of a computing system 1100 that may be used in accordance with embodiments of the present invention. For example, cloud infrastructure system 100 may comprise one or more computing devices. System 1100 depicted in FIG. 11 may be an example of one such computing device. Computer system 1100 is shown comprising hardware elements that may be electrically coupled via a bus 1124. The components may include one or more processing units 1102, an input subsystem 1104, an output subsystem 1106, storage devices 1108, a computer-readable storage media reader 1112 connected to a computer-readable storage medium 1110, a communication subsystem 1114, a processing acceleration subsystem 1116, and working memory 1118.

Bus subsystem 1124 provides a mechanism for letting the various components and subsystems of computer system 1100 communicate with each other as intended. Although bus subsystem 1124 is shown schematically as a single bus, alternative embodiments of the bus subsystem may utilize multiple busses.

Input subsystem 1104 may include one or more input devices such as a mouse, a keyboard, a pointing device, a touchpad, etc. In general, input subsystem 1104 may include any device or mechanism for inputting information to computer system 1100.

Output subsystem 1106 may include one or more output devices for outputting information from computer system 1100. Examples of output devices include without limitation a display device, a printer, a projection device, etc. In general, output subsystem 1106 may include any device or mechanism for outputting information from computer system 1100.

Processing unit(s) 1102 can include one or more processors, one or more cores of processors, combinations thereof, and the like. In some embodiments, processing unit(s) 1102 can include a general purpose primary processor as well as one or more special purpose co-processors such as graphics processors, digital signal processors, or the like. In some embodiments, some or all processing units 1102 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1102 can execute instructions stored in working memory 1118 or on storage devices 1108. In various embodiments, processing units 1102 can execute a variety of programs or code instructions and can maintain multiple concurrently executing programs or processes. At any given time, some or all of the program code to be executed can be resident in system working memory 1118, storage devices 1108, and/or on computer-readable storage media 1110. Through suitable programming, processing units 1102 can provide various functionalities described above for performing event stream-related processing. In some embodiments, computer system 1100 may also include a processing acceleration unit 1116, which can include a digital signal processor (DSP), a special-purpose processor, and/or the like.

Storage device(s) 1108 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 1102 to provide the functionality described above, may be stored on storage devices 1108. Storage devices 1108 may also provide a repository for storing data used in accordance with embodiments of the present invention.

Computer-readable storage media reader 1112 can further be connected to a computer-readable storage medium 1110, together (and, optionally, in combination with storage device(s) 1108) comprehensively representing remote, local, fixed, and/or removable memory storage devices plus storage media for temporarily and/or more permanently containing computer-readable information.

Communications subsystem 1114 may permit data to be exchanged with network 710 and/or any other computers described above with respect to system environment 700. Communication subsystem 1114 serves as an interface for receiving data from and transmitting data to other systems from computer system 1100. The communication may be provided using wired or wireless protocols. For example, communication subsystem 1114 may enable computer 1100 to connect to a client device via the Internet. Communication subsystem 1114 may comprise a modem, a network card (wireless or wired), an infra-red communication device, a GPS receiver, etc.

Working memory subsystem 1118 may include a number of memories including a main random access memory (RAM) for storage of instructions and data during program execution and a read only memory (ROM) in which fixed instructions are stored. Software elements such as an operating system 1120 and/or other code 1122, such as an application program (which may be a client application, Web browser, mid-tier application, RDBMS, etc.), may be stored in working memory 1118. In an exemplary embodiment, working memory 1118 may include executable code and associated data structures (such as caches) used for processing events and enabling variable duration windows processing as described above.

It should be appreciated that alternative embodiments of computer system 1100 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   determining, by a computing system, that a user is associated with multiple roles;
   identifying, by the computing system, a set of notification templates for the multiple roles associated with the user, wherein the set of notification templates is identified from a plurality of notification templates, wherein a first notification template in the set of notification templates is associated with a first role, wherein a second notification template in the set of notification templates is associated with a second role, and wherein the first notification template is different from the second notification template;
   generating, by the computing system, an additional notification template by combining the first notification template and the second notification template, wherein the first notification template and the second notification template for the combining are identified based on the multiple roles associated with the user; and
   sending, using the additional notification template, a notification to the user.

2. The method of claim 1, wherein each notification template in the set of notification templates indicates different information about a type of event based on the role.

3. The method of claim 1, wherein the first role and the second role are roles in a plurality of roles arranged in a role hierarchy, wherein the plurality of notification templates are arranged in a notification template hierarchy that maps to the role hierarchy, and wherein the first notification template and the second notification template are combined to generate the additional notification template based on a location of the first role and the second role in the role hierarchy.

4. The method of claim 1, wherein the notification includes information about an event occurring in a cloud infrastructure system.

5. The method of claim 4, wherein the first notification template indicates information about a first type of event in the cloud infrastructure system, and wherein the second notification template indicate indicates information about a second type of event in the cloud infrastructure system.

6. The method of claim 1, wherein the first role and the second role are associated with a user overlap.

7. The method of claim 1, further comprising:
   determining a plurality of notifications to send to the user based on the roles associated with the user, each of the plurality of notifications generated based on one or more of the plurality of notification templates; and
   collapsing the plurality of notifications into one or more notifications based on the roles associated with the user.

8. A system comprising:
   one or more processors; and
   a memory operatively coupled to the one or more processors, wherein the memory stores a set of instructions that, when executed by the one or more processors, causes the one or more processors to:
   determine that a user is associated with multiple roles;
   identify a set of notification templates for the multiple roles associated with the user, wherein the set of notification templates is identified from a plurality of notification templates, wherein a first notification template in the set of notification templates is associated with a first role, wherein a second notification template in the set of notification templates is associated with a second role, and wherein the first notification template is different from the second notification template;
   generate an additional notification template by combining the first notification template and the second notification template, wherein the first notification template and the second notification template for the combining are identified based on the multiple roles associated with the user; and
   send, using the additional notification template, a notification to the user.

9. The system of claim 8, wherein each notification template in the set of notification templates indicates different information about a type of event based on the role.

10. The system of claim 8, wherein the first notification template indicates information about a first type of event in a cloud infrastructure system, and wherein the second notification template indicate indicates information about a second type of event in the cloud infrastructure system.

11. The system of claim 8, wherein the set of instructions, when executed by the one or more processors, further causes the one or more processors to:
- determine a plurality of notifications to send to the user based on the roles associated with the user, each of the plurality of notifications generated based on one or more of the plurality of notification templates; and
- collapse the plurality of notifications into one or more notifications based on the roles associated with the user.

12. A non-transitory computer-readable medium storing a set of instructions which, when executed by one or more processors, causes the one or more processors to:
- determine that a user is associated with multiple roles;
- identify a set of notification templates for the multiple roles associated with the user, wherein the set of notification templates is identified from a plurality of notification templates, wherein a first notification template in the set of notification templates is associated with a first role, wherein a second notification template in the set of notification templates is associated with a second role, and wherein the first notification template is different from the second notification template;
- generate an additional notification template by combining the first notification template and the second notification template, wherein the first notification template and the second notification template for the combining are identified based on the roles associated with the user; and
- send, using the additional notification template, a notification to the user.

13. The non-transitory computer-readable medium of claim 12, wherein each notification template in the set of notification templates indicates different information about a type of event based on the role.

14. The non-transitory computer-readable medium of claim 12, wherein the first notification template indicates information about a first type of event in the cloud infrastructure system, and wherein the second notification template indicate indicates information about a second type of event in a cloud infrastructure system.

15. The method of claim 1, wherein each notification template of the plurality of notification templates indicates one or more notifications of information associated with an event, the one or more notifications to be received by the first role or the second role.

* * * * *

UNITED STATES PATENT AND TRADEMARK OFFICE
CERTIFICATE OF CORRECTION

PATENT NO. : 9,646,069 B2
APPLICATION NO. : 14/877835
DATED : May 9, 2017
INVENTOR(S) : Khalsa et al.

It is certified that error appears in the above-identified patent and that said Letters Patent is hereby corrected as shown below:

On the Title Page

On page 3, Column 2, under Other Publications, Line 64, delete "Catacylsm" and insert
-- Cataclysm --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*